United States Patent [19]

Mine et al.

[11] Patent Number: 5,113,345
[45] Date of Patent: May 12, 1992

[54] SYSTEM FOR CONTROLLING ACTIVE SUSPENSIONS OF A VEHICLE

[75] Inventors: Atsushi Mine, Gunma; Katsuyoshi Kamimura, Tochigi; Yutaka Hiwatashi, Gunma, all of Japan

[73] Assignee: Fuji Jukogyo Kabushiki Kaisha, Tokyo, Japan

[21] Appl. No.: 526,908

[22] Filed: May 22, 1990

[30] Foreign Application Priority Data

May 29, 1989 [JP] Japan .................. 1-135368

[51] Int. Cl.5 ............................ B60G 17/00
[52] U.S. Cl. .................. 364/424.05; 280/707; 280/DIG. 1
[58] Field of Search ........... 364/424.05; 280/707, 280/DIG. 2, 840, 6.1

[56] References Cited

U.S. PATENT DOCUMENTS

| | | | |
|---|---|---|---|
| 4,712,807 | 12/1987 | Kurosawa | 280/707 |
| 4,803,627 | 2/1989 | Yasuike et al. | 364/424.05 |
| 4,821,191 | 4/1989 | Ikemoto et al. | 364/424.05 |
| 4,897,776 | 1/1990 | Urababa et al. | 364/424.05 |
| 4,903,209 | 2/1990 | Kaneko | 364/424.05 |
| 4,913,457 | 4/1990 | Häfner et al. | 280/707 |
| 4,924,392 | 5/1990 | Kurosawa | 364/424.05 |

Primary Examiner—Parshotam S. Lall
Assistant Examiner—V. Trans
Attorney, Agent, or Firm—Beveridge, DeGrandi & Weilacher

[57] ABSTRACT

In a system for controlling active suspensions of a motor vehicle, having fluid suspensions for the respective wheels, a longitudinal acceleration sensor, a lateral acceleration sensor, control valves for the respective suspensions, and a controller for producing a control quantity to adjust the control valves to charge and discharge fluid into and out of the fluid suspensions so as to control the vehicle attitude, the reaction force of each suspension is detected and a mean value of the suspension reaction force is calculated to determine the loading condition of the vehicle while the vehicle is driven straight ahead at a constant speed. The control quantity is corrected by a correcting circuit so as to match the loading condition of the vehicle whereby the vehicle attitude is precisely controlled so as to match the vehicle weight even in such a transient state as acceleration, deceleration and turning. The internal pressure of each suspension may be detected as the reaction force.

12 Claims, 7 Drawing Sheets

SYSTEM FOR CONTROLLING ACTIVE SUSPENSIONS OF A VEHICLE

BACKGROUND OF THE INVENTION

The present invention relates to a system for controlling an active suspension of a vehicle.

Active suspension systems of various forms having been developed and disclosed as in Japanese Pat. Appln. Laid-Open Publn. No. 62-139709. A typical example of a known active suspension system comprises the following essential components. An individual suspension is provided for each wheel for supporting the vehicle by fluid pressure. Charging and discharging fluid into or out of each suspension are controlled independently by operations of a respective control valve. The operation of each control valve is controlled by opening and closing control signals generated by a controller responsive to information such as vertical acceleration of the vehicle mass above a suspension unit or a vertical displacement of the suspension. And the controller calculates a command quantity of charging and discharging the fluid for each suspension unit. Thus charging and discharging the fluid into and out of each suspension are controlled.

Applicant has previously developed an active suspension system described hereinafter and has filed a U.S. patent application therefor. In the active suspension system as described above, sensors are used to detect accelerations in the longitudinal and lateral directions of the vehicle. The above described controller preestimates variations of a vehicle attitude (pitching and rolling) accompanying the acceleration, the deceleration and a turn of the vehicle in response to the information from the sensors. Then, the controller computes the command quantity of charging and discharging the fluid for maintaining the vehicle attitude in a desirable state, thus generating and transmitting the signals for opening and closing the control valves.

The active suspension system described above carries out a feedback control and a predictor control. That is, in the feedback control, the system carries out a control such that a desired vehicle attitude is maintained in response to variations of a vehicle state such as extension and contraction of each suspension. In the predictor control, longitudinal and lateral accelerations are detected, and the vehicle attitude is controlled by predicting a quantity of load shift which will occur as a result of the accelerations.

In such an active suspension system, variations of vehicle weight do not effect the feedback control. However, in the predictor control, the amount of charging and discharging fluid into and out of each suspension becomes deficient or excessive when the loading condition of the vehicle varies so that the vehicle weight becomes larger or smaller than a reference vehicle weight which is the weight of a vehicle in a predetermined condition (for example, the vehicle is in a straight running condition with only one passenger, the driver without any other load). However, according to the predictor control stated above, it is impossible to maintain the vehicle attitude in a desired state under a transitional vehicle condition such as acceleration, deceleration or turning thereof.

SUMMARY OF THE INVENTION

It is an object of the present invention to eliminate the problem described above and to provide a system for controlling active suspensions of a vehicle by which the vehicle attitude is maintained in a desired state even in a transitional condition such as acceleration, deceleration and turning.

According to the present invention, there is provided a system for controlling active suspensions of a vehicle having fluid suspensions provided for respective wheels, means for charging and discharging fluid into and out of the respective fluid suspensions to extend and contract the suspensions independently, G-sensor means provided in the vehicle for detecting acceleration of the vehicle, and a controller responsive to an acceleration signal from the G-sensor for producing a control quantities to adjust said charging and discharging means so as to control an amount of the fluid to maintain the vehicle attitude in a desired state, said system comprising: detection means for detecting a quantity representing reaction force of each suspension, means responsive to a reaction force signal from the detector for calculating a mean value of the suspension reaction force to determine the loading condition of the vehicle, and correcting means responsive to the mean value for correcting the control quantity to match the loading condition.

In the predictor control according to the present invention, longitudinal and lateral accelerations are used to calculate the quantities of longitudinal and lateral load shift. The quantities of load shift are used to calculate variation of the suspension reaction force, and the amount of charging and discharging fluid into and out of each suspension is calculated so as to match the variation of the reaction force. The calculated quantities of load shift or the calculated amounts of charging and discharging fluid are corrected by the correcting means so as to control the vehicle attitude according to the vehicle weight, whereby a desirable vehicle attitude is maintained with high precision even in a transitional condition of the vehicle.

A preferred embodiment of the present invention will become understood from the following detailed description referring to the accompanying drawings.

DESCRIPTION OF THE PREFERRED EMBODIMENTS

Figure 1:
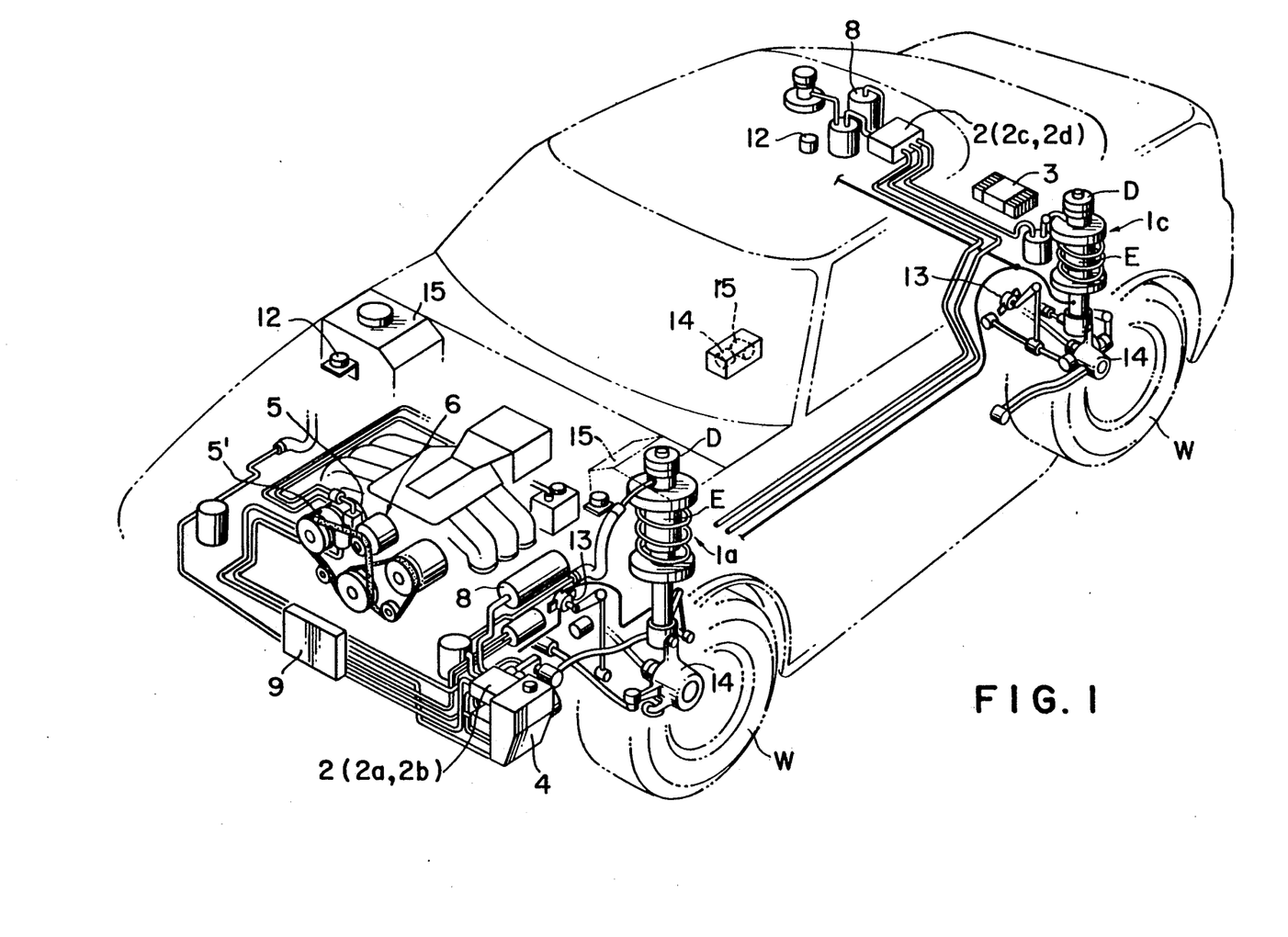
FIG. 1 is a schematic perspective view of a motor vehicle showing a layout of a control system according to the present invention.
Figure 2:
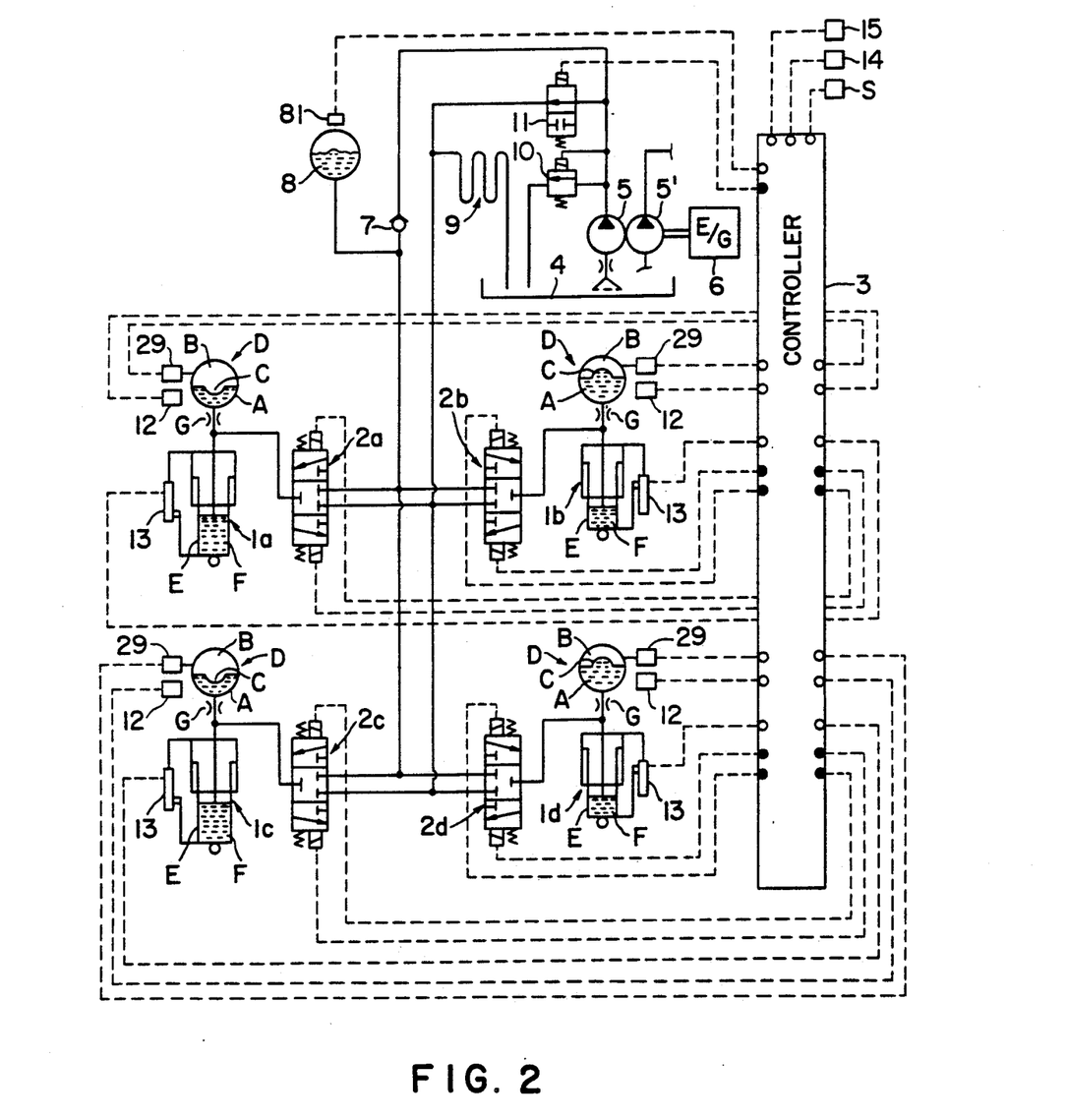
FIG. 2 is a diagram showing a hydraulic system for suspension units according to the present invention.

FIGS. 1 and 2 show an active suspension system to which the present invention is applied. In FIG. 2, reference characters 1a and 1b indicate suspensions of left and right front wheels of a motor vehicle, and 1c and 1d indicate suspensions of left and right rear wheels. Each of the suspensions 1a, 1b, 1c and 1d is provided with a pneumatic spring portion D and a hydraulic cylinder E. The spring portion D has an oil chamber A and an air chamber B which are divided by a diaphragm C. The oil chamber A of the spring portion D communicates with an oil chamber F of the hydraulic cylinder E through an orifice G. As shown in FIG. 1, one end of the hydraulic cylinder E (such as a bottom portion of the cylinder) is connected to a suspension arm member 14 on the vehicle wheel W, and the other end (a piston rod) of the hydraulic cylinder E is connected to a member 15 of a vehicle chassis. In accordance with load on the cylinder E, hydraulic oil in the oil chamber F flows into and out of the oil chamber A through the orifice G so as to generate an appropriate damping force and at the same time to produce a spring action by the volumetric elasticity of the air sealed in the air chamber B. The system described above is a known hydro-pneumatic suspension system.

There are provided control valves 2a, 2b, 2c and 2d to supply and discharge oil to and from the oil chamber F of the hydraulic cylinders E. The control valves 2a, 2b, 2c and 2d are operated independently by a valve drive signal from a controller 3 to be described later. In FIG. 1, the control valves 2a, 2b, 2c and 2d are installed separately in two groups for the front and rear suspensions.

An oil pump 5 is driven by an engine 6 to pump up the oil from an oil reservoir 4 to the system. In the system shown, an oil pump 5' for power steering and the oil pump 5 described above are driven in tandem by the engine 6.

The oil discharged from the oil pump 5 passes through a check valve 7 and is stored in a high-pressure accumulator 8. In FIG. 1, the accumulator 8 is shown to be divided into two sections for the front and rear suspensions. When some of the control valves 2a, 2b, 2c and 2d are switched to the intake side, a high-pressured oil is supplied to the oil chamber F of the suspensions 1a, 1b, 1c and 1d through the control valves that have been switched to the intake side. When some of the control valves 2a, 2b, 2c and 2d are switched to the discharging side, the oil is discharged from the oil chambers F of the suspensions 1a, 1b, 1c and 1d and the oil passes through an oil cooler 9 into the oil reservoir 4.

FIG. 2 shows a relief valve 10 and a valve 11 which is switched to the unload state indicated in the figure, when signals, generated by the controller 3 responsive to signals from a pressure sensor 81, indicate that the high-pressure accumulator 8 has attained a predetermined pressure. When the valve 11 is switched to the unload side, the oil discharged from the oil pump 5 flows to the oil cooler 9 and then into the oil reservoir 4.

The suspensions 1a, 1b, 1c and 1d are provided with suspension stroke sensors 13 as shown in FIGS. 1 and 2. The sensor 13 detects vertical relative displacement for each suspension provided between the wheel and the vehicle body and input the information of the relative displacement for each of the suspensions 1a, 1b, 1c and 1d to the controller 3.

In order to detect behaviors of the vehicle, there are provided a vertical G-sensor 12 to detect vehicle vertical acceleration (vertical G), a lateral G-sensor 15 to detect vehicle lateral acceleration (lateral G) and a longitudinal G sensor 14 to detect vehicle longitudinal acceleration (longitudinal G). FIG. 1 indicates the positions where the G-sensors 12, 15 and 14 are installed. There is further provided a vehicle speed sensor S to detect the speed of the vehicle. The lateral acceleration may be computed from the vehicle speed detected by the sensor S and steering angle detected by a steering angle sensor, or computed from steering torque and steering assisting force instead of using the lateral G-sensor. Signals of the sensors 12, 13, 14, 15 and S are inputted to the controller 3. Responsive to the input, the controller 3 determines control quantity for charging and discharging the oil for each suspension and sends (outputs) valve drive signals to the respective control valves 2a, 2b, 2c and 2d to control charging and discharging the oil into and from each of the suspensions as will be described below with reference to FIGS. 3 through 6.

Figure 3:
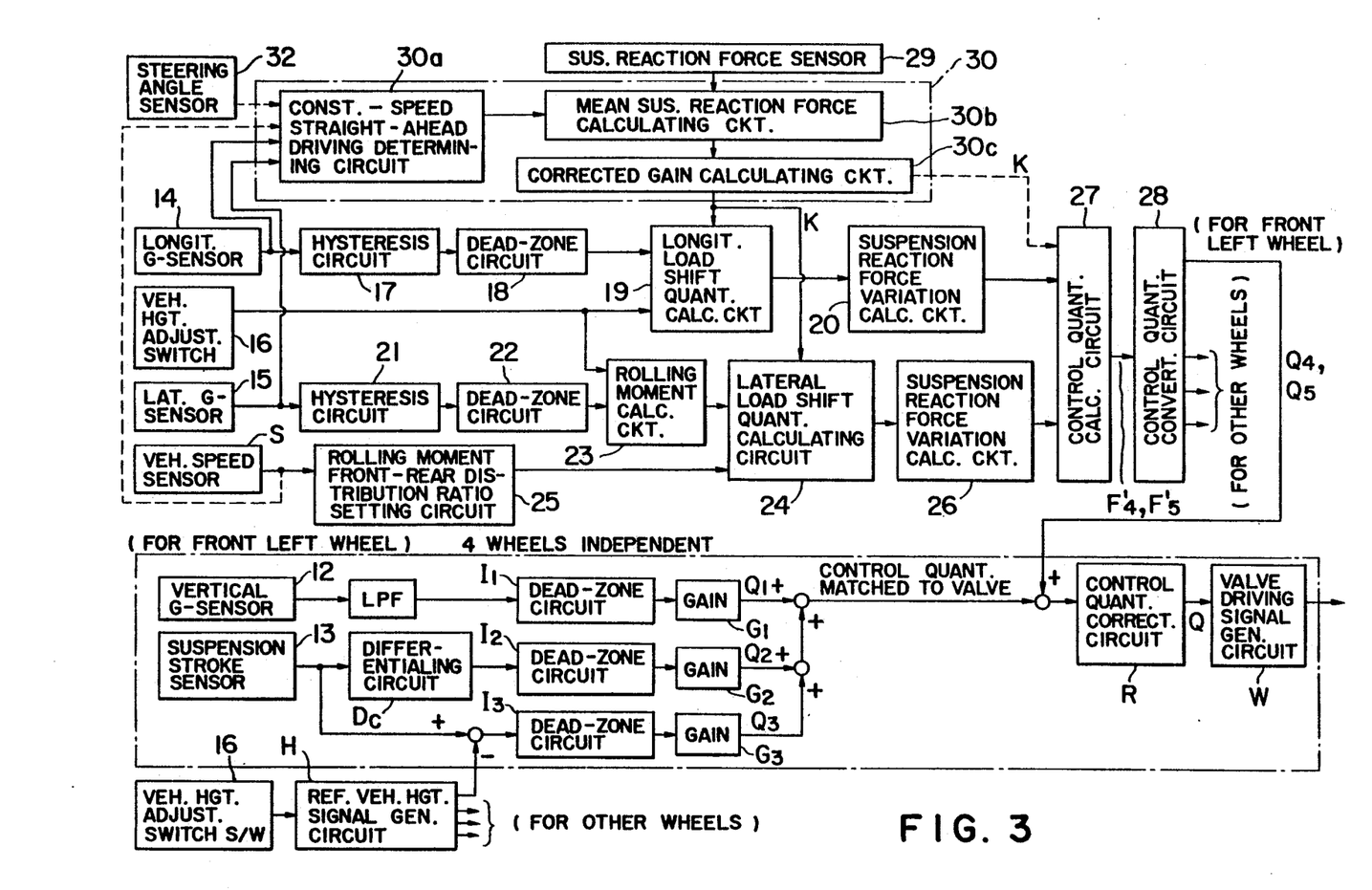
FIG. 3 is a block diagram of the control system according to the present invention.

In FIG. 3, the portion in a chain line is a block diagram for controlling one of four suspensions 1a, 1b, 1c and 1d, for example, the suspension 1a of the left front wheel. While not shown in FIG. 3, four sets of the same control logic are provided for independently controlling the respective suspensions 1a, 1b, 1c and 1d.

In each suspension unit, the vertical acceleration and the vertical relative displacement (stroke) are respectively detected by the sensors 12 and 13. The vertical acceleration signal from the vertical G-sensor 12 is passed through a low-pass filter LPF to reduce its high-frequency component. The signal is then passed through a dead-zone circuit $I_1$ to remove a signal of a set range in the neighborhood of zero. The resulting signal is subjected to multiplication by a gain circuit $G_1$. Thus a control command quantity $Q_1$ matched to the characteristics of the corresponding control valve 2a, 2b, 2c or 2d is obtained.

The vertical relative displacement or the stroke signal from the stroke sensor 13 is inputted to a differentiating circuit Dc and a dead-zone circuit $I_3$. The signal passing through the differentiating circuit Dc is converted into a vertical relative displacement or a stroke speed signal. The speed signal passes through a dead-zone circuit $I_2$, which removes therefrom a signal fraction within a set zone in the vicinity of zero. The resulting signal is passed through a gain circuit $G_2$ to become a control command quantity $Q_2$ matched to the corresponding control valve characteristics.

By setting a vehicle height adjusting switch 16, a reference vehicle height signal is generated from a reference vehicle height generating circuit H. The reference vehicle height signal is subtracted from the vertical relative displacement signal to be inputted to the dead-zone circuit $I_3$, and an actual relative displacement signal is obtained. The actual relative displacement signal is passed through the dead-zone circuit $I_3$, where a signal fraction within a set zone in the vicinity of zero is removed therefrom. The resulting signal is passed through a gain circuit $G_3$ to become a control command quantity $Q_3$ matched to the corresponding control valve characteristic.

The control command quantity ($Q_1$, $Q_2$, and $Q_3$) matched to the characteristics of the corresponding control valve is as follows. In the case where the control valve is, for example, a flow rate control valve, the control command quantity is the length of opening time of the valve, necessary to obtain a required quantity of hydraulic oil to be charged or discharged. The length of the valve opening time is determined with consideration of the valve opening-closing characteristics.

The three control command quantities $Q_1$, $Q_2$, and $Q_3$ are added as shown. The resulting sum of the quantities is passed through a control quantity correction circuit R to be converted into a corrected command quantity Q corrected by such an environmental condition as temperature and pressure loss due to length of piping. The corrected quantity Q is passed through a valve driving signal generating circuit W, which thereupon generates a control valve opening/closing signal. Thus, the control valve 2a is switched to the oil charge side or the discharge side. As a result, charging or discharging the oil of the command quantity into or out of the suspension 1a is accomplished.

In the control operation described above, when vertical acceleration is detected, oil within the suspension 1a, for example, is discharged responsive to upward acceleration. For downward acceleration, oil is charged into the suspension 1a. By such a control operation, with respect to forces from below such as a bump or thrust from the road surface, soft and high-attenuation suspension characteristics are created. With respect to forces from above (i.e., from the vehicle body), hard suspension characteristics are created so as to maintain the vehicle height at the reference vehicle height due to the control responsive to the vertical stroke speed and the vertical stroke, by controlling the charge and discharge of the oil.

Furthermore, by passing the vertical acceleration signal through the low-pass filter LPF, the control system does not react to vibrations in the high-frequency region as in resonance of the mass below the suspensions, but responds to vibrations of low-frequency region as in resonance of the mass above the suspensions. Accordingly, the control system can avoid bouncing so as to improve the driveability, thus preventing waste of energy for the control.

The vehicle height adjusting switch 16 is a changeover switch for changing over, for example, from normal vehicle height to high vehicle height. When normal vehicle height is selected, the reference vehicle height signal generating circuit H generates a low reference vehicle height signal. When the vehicle height adjusting switch 16 is changed over to the side of the high vehicle height, the reference vehicle height signal generating circuit H generates a high reference vehicle height signal.

The control responsive to the vertical stroke signal from the sensor 13 functions to maintain the vehicle height at the reference vehicle height. Therefore, when the reference vehicle height is switched from the normal reference vehicle height to the high reference vehicle height, the control command quantity $Q_3$ is generated for charging the oil. Thus the oil is charged into the suspension 1a, for example, thereby to raise the vehicle height to a height equal to the high reference vehicle height. When the vehicle height adjusting switch 16 is returned to the side of the normal vehicle height, the control command quantity $Q_3$ is generated for the discharging oil. Thus, the oil within the suspension 1a is discharged. As a consequence, the vehicle is lowered to the normal reference vehicle height. Discharging and charging the oil are simultaneously carried out for all the suspensions by the switching operation of the wheel height adjusting switch 16.

In addition to the control in the state of normal driving state, control is necessary also when a large acceleration is suddenly applied in the longitudinal direction or the lateral direction of the vehicle at the time of sudden braking, abrupt acceleration, or sudden turning. In such a case, prompt and positive control of the vehicle attitude without delay is required. For this purpose, there is provided a control logic based on the detection signals of the longitudinal G-sensor 14 and the lateral G-sensor 15.

More specifically, as shown in FIG. 3, the longitudinal acceleration signal detected by the longitudinal G-sensor 14 is passed through, and converted by a hysteresis circuit 17 and a dead-zone circuit 18. By the hysteresis and dead-zone circuits 17 and 18, the longitudinal acceleration signal is converted to attain a control which does not respond to longitudinal G fluctuations of an ordinary order during normal driving but responds to large pitching of the vehicle body, at the time of full acceleration or of braking with larger degree than medium. The signal thus converted is then introduced into a circuit 19 for calculating longitudinal load shift quantity.

The calculating circuit 19 operates to calculate the load shift quantity in the longitudinal direction, responsive to the input signal fed thereinto, previously stored vehicle specification, such as a standard vehicle weight, and information on the present height of the vehicle center of gravity above the ground determined from the vehicle height adjusting switch 16.

The calculation result is transmitted to a circuit 20 for calculating the variation of the suspension reaction force. The calculating circuit 20 operates to calculate the variation of the suspension reaction force, which may arise from the load shift quantity at each position of the suspension, with consideration of driving force and braking force acting on the wheels responsive to the information thus fed thereinto and other information such as the type of the suspensions and the driving type (front-wheel drive, rear wheel drive, four-wheel drive, etc.).

Consideration of the driving force and the braking force acting on the tires depending upon the type of the suspensions and the driving type, has the following significance. In the case of a trailing-arm type suspension, when a braking force acts on the wheel, the reaction force is received and held by a bearing of the trailing arm. For this reason, in general, a moment in the direction for compressing the suspension is applied to the trailing arm (antilift geometric characteristic at the time of braking). Accordingly, the reaction force to the front wheel increases and the reaction force to the rear wheel decreases with respect to longitudinal load shifting quantity which arises due to inertial force. As a suspension reaction force at the time of acceleration, a moment is applied in the direction for stretching the suspension spring due to the driving reaction force to a driving wheel. Such a moment does not occur in a driven wheel.

As described above, the variation of the suspension force differs in accordance with the position of the trailing arm and the position of a rocking or pivoting axis thereof. In the case of a suspension of the wishbone type, the variation of the suspension reaction force differs depending upon the inclinations of the rocking axes of upper and lower control arms. In the case of a MacPherson type suspension, the variation differs depending upon factors such as the inclination of a suspension strut and the position of rotational axis of a lower arm. Therefore, the variation of the reaction force is calculated on the basis of the type of suspension and the type of driving.

Similarly, as in the case of the longitudinal G-sensor 14, the lateral acceleration detected by the lateral G-sensor 15 is also passed through a hysteresis circuit 21 and a dead-zone circuit 22. Thus, the control avoids response to minute lateral G-fluctuations occurring during normal driving. In this manner, only a signal above a predetermined value is inputted to a circuit 23 for calculating the rolling moment. From the input signal, the calculating circuit 23 operates to calculate the rolling moment on the basis of the vehicle specification previously stored, such as the standard vehicle weight, information of the height of the vehicle body center of gravity determined by the vehicle height adjusting switch 16, and the height of the rolling center determined by the suspension geometry. The calculation result is transmitted to a circuit 24 for calculating a lateral load shift quantity.

Separately, a vehicle speed signal generated by a vehicle speed sensor S is transmitted to a circuit 25 for setting rolling moment front-rear distribution ratio. From the vehicle speed information thus received, the circuit 25 determines the rolling moment front-rear distribution ratio on the basis of a characteristic of a previously set vehicle speed-rolling moment front-rear distribution ratio. The determined rolling moment front-rear distribution ratio is transmitted to the calculating circuit 24.

The calculating circuit 24 operates to distribute the generated rolling moment inputted from the rolling moment calculating circuit 23 to the front and rear wheels and to calculate the lateral shift load quantity between the lateral load of the front and rear wheels on the basis of the rolling moment front-rear distribution ratio determined by the distribution ratio setting circuit 25.

The resulting output of the calculating circuit 24 is fed to a circuit 26 for calculating the variation of the suspension reaction force. In the calculating circuit 26, the total lateral force acting on the wheels corresponding to the generated lateral G is distributed to the front and rear wheels based on the yaw moment equilibrium equation with the position of the vehicle center of gravity and the distance between the front and rear axles. Then, with consideration of the lateral load shift quantity between the front and rear wheels calculated by the calculating circuit 24, the lateral forces on the front and rear wheels, the vehicle height, and the type of the suspensions, the variation of the suspension reaction force is calculated separately for each of the front and rear suspensions.

The variation of the suspension reaction forces calculated by the calculating circuits 20 and 26 are added in a circuit 27 for calculating control quantity. The total variation of the suspension reaction force is determined for each suspension. Furthermore, the control quantity of charge and discharge of the oil matches with the total variation of the suspension reaction force for maintaining the internal pressure of each suspension. The resulting control quantity is converted into a control command quantity matching the valve specification or characteristic in a circuit 28 for converting control quantity. The converted control command quantity is added to the control command quantities $Q_1$, $Q_2$, and $Q_3$. The resulting quantity is fed into a circuit R for correcting the control quantity.

As described above, there is provided a control system for controlling the charge and discharge of oil for each suspension independently in response to vertical acceleration of the mass above the suspension and the vertical relative displacement between the masses above and below the suspensions so as to improve the driveability. Moreover, the above control system controls the vehicle attitude responsive to the longitudinal G and the lateral G of the vehicle. By the arrangement described above, under driving conditions such as the acceleration and the turning, vehicle body attitude is controlled without responsive delay by the control logic based on the longitudinal G and the lateral G, with respect to, transitionally, the pitching and rolling of the vehicle body.

At the same time, there is an advantage described below since the control system controls the vehicle body rolling on the basis of the front-rear distribution ratio of the rolling moment according to the vehicle speed. That is, at high vehicle speed, a steering characteristic is maintained in an ordinary under-steering condition to keep the stability of the vehicle (in general, it is set at weak under-steering condition). At low vehicle speed, the under-steering tendency is weakened further relative to the under-steering at high vehicle speed, or alternatively, the steering characteristic is changed to the over-steering thereby to increase the turning characteristic of the vehicle. By such measures, it becomes possible to vary the steering characteristic in accordance with the vehicle speed.

In the control system described above with reference to FIG. 3, the control in response to the detection signals of the vertical G-sensor 12 and the suspension stroke sensors 13 is a feedback control to compensate variations of the vehicle body attitude. The feedback control is unaffected by changes in the weight of the vehicle body due to variations in loading conditions. However, the control in response to the detection signals of the longitudinal G-sensor 14 and the lateral G-sensor 15 is a predictor control. More specifically, when a longitudinal acceleration or a lateral acceleration occurs, the load shifting quantity which is expected to arise thereby is predicted, and the vehicle body attitude is so controlled on the basis of the prediction that variation in the vehicle body attitude will not occur. For this reason, when the vehicle body weight varies as a consequence of the loading state, the control quantity becomes deficient or excessive. As a result, in a transient state, the control system becomes incapable of fully performing its function.

In order to overcome the problem described above, the control system is provided with a sensor 29 for detecting suspension reaction force, as indicated in FIG. 2. The sensor 29 operates to detect the suspension reaction force in each of the suspensions $1a$, $1b$, $1c$, and $1d$ for the respective wheels in terms, for example, of the internal pressure of each suspension or a pertinent load cell indication. As shown in FIG. 3, a resulting detection signal of the sensor 29 is transmitted to a circuit 30 for calculating a corrected gain.

Figure 4:
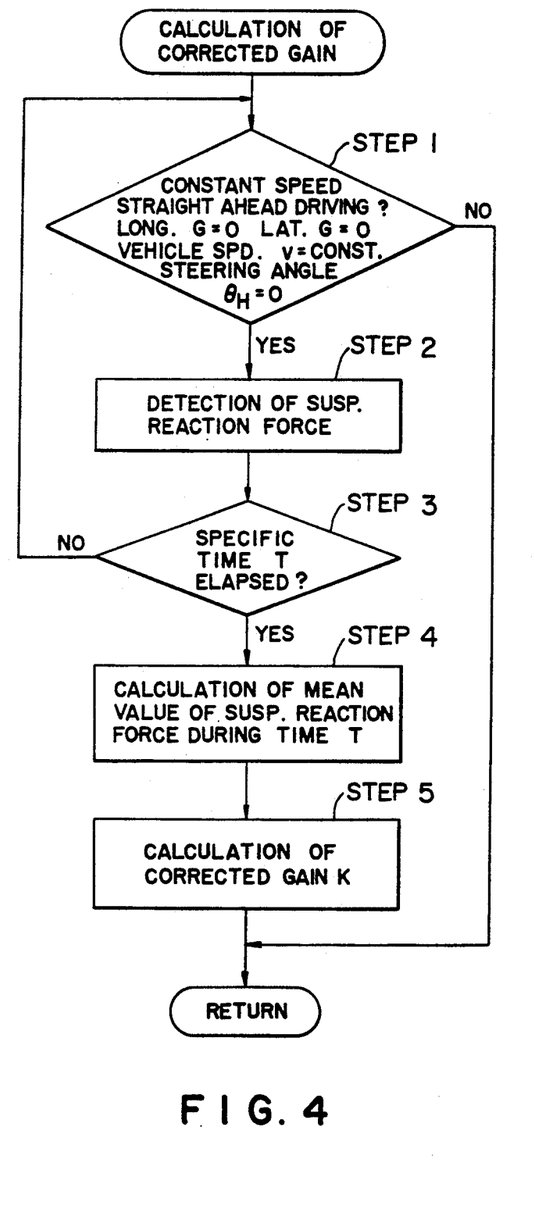
FIGS. 4 and 5 are flow charts explaining control steps of the control system of FIG. 3.

The circuit 30 will now be described in conjunction with the block diagram of FIG. 3 and the flow charts of FIGS. 4 and 5. The essential components of the corrected gain calculating circuit 30 are a circuit $30a$ for determining the state of constant-speed and straight-ahead driving, a circuit $30b$ for calculating the mean value of suspension reaction force, and a circuit $30c$ for calculating the corrected gain. The determining circuit $30a$ receives the detection signals from the longitudinal G-sensor 14 and the lateral G-sensor 15. In the case when the longitudinal acceleration and the lateral acceleration are both approximately zero, the determining circuit $30a$ determines that the vehicle is driving in the constant-speed and straight-ahead driving state (FIG. 4, step 1).

The determination may be made in accordance with detection signals from the vehicle speed sensor S and a steering angle sensor 32 instead of the signals from the longitudinal and lateral acceleration sensors 14 and 15. In this case, the driving state of the vehicle is determined to be constant-speed and straight-ahead driving state when the vehicle speed is constant and the steering angle is zero.

Responsive to the determination of the determining circuit 30a, the circuit 30b calculates the mean value F, during a specific time T, of the suspension reaction force detected by the sensor 29 (steps 2, 3 and 4). The specific time T is set to be longer than the vehicle body pitching period. The time T is, for example, approximately 2 seconds. Responsive to the signal of the mean value F of suspension reaction force, the circuit 30c calculates for each suspension the corrected gain K=F/Fo (step 5), where Fo is a reference suspension reaction force corresponding to the standard vehicle weight which is, for example, a weight of the vehicle that is driven straight ahead at a constant speed by only one passenger, the driver without any other load.

Figure 5:
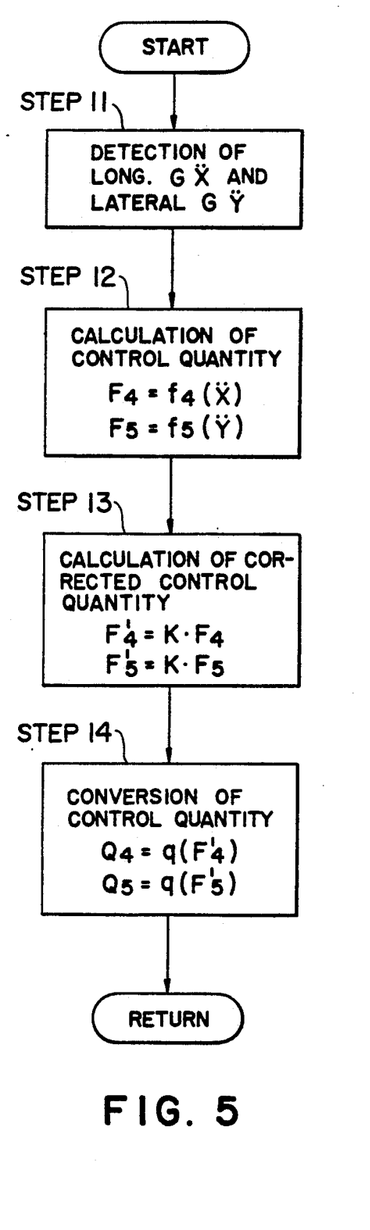

The control quantity calculated based on the longitudinal and lateral accelerations is multiplied by the calculated corrected gain K (FIG. 5, step 13). Previous steps 11 and 12 shown in FIG. 5 have already been described with reference to FIG. 3. The multiplication by the corrected gain K may be made for the longitudinal load shift quantity calculated by the circuit 19 and for the lateral load shift quantity calculated by the circuit 24, as indicated by solid lines in FIG. 3. Alternatively, the multiplication by the corrected gain K may be made for the control quantity calculated by the circuit 27, as indicated by broken line in FIG. 3.

By correcting the gain K in accordance with variations of the vehicle weight as described above, a predictor control of the vehicle attitude in transitional states is effected reliably on the basis of detected longitudinal and lateral accelerations, and it becomes possible to control the vehicle attitude as desired.

In the embodiment described above, charging and discharging the oil into and out of each suspension are controlled in terms of the flow rate of the oil by adjusting the opening time of the control valves.

Figure 6:
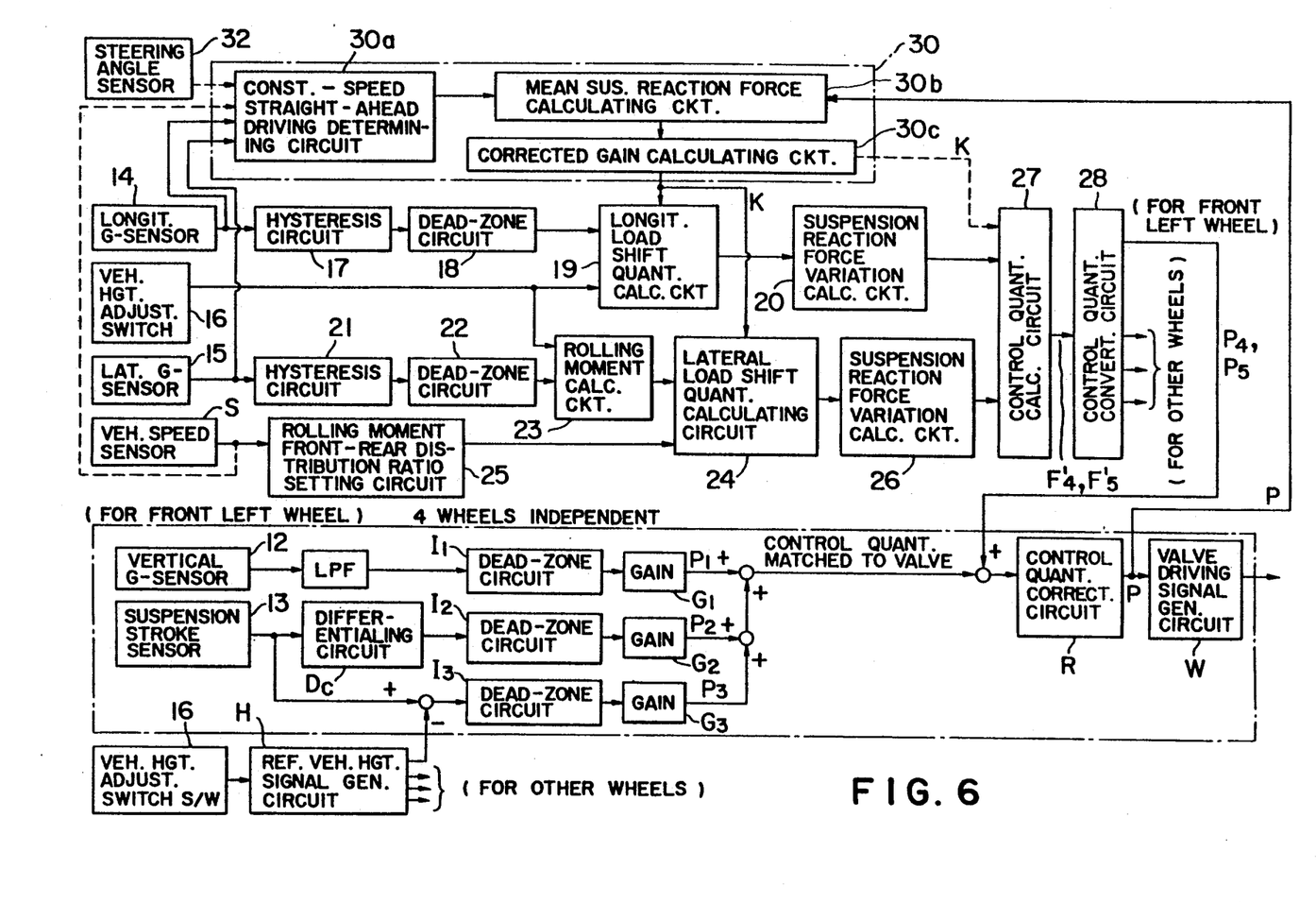
FIG. 6 is a block diagram showing a system according to a second embodiment of the present invention.
Figure 7:
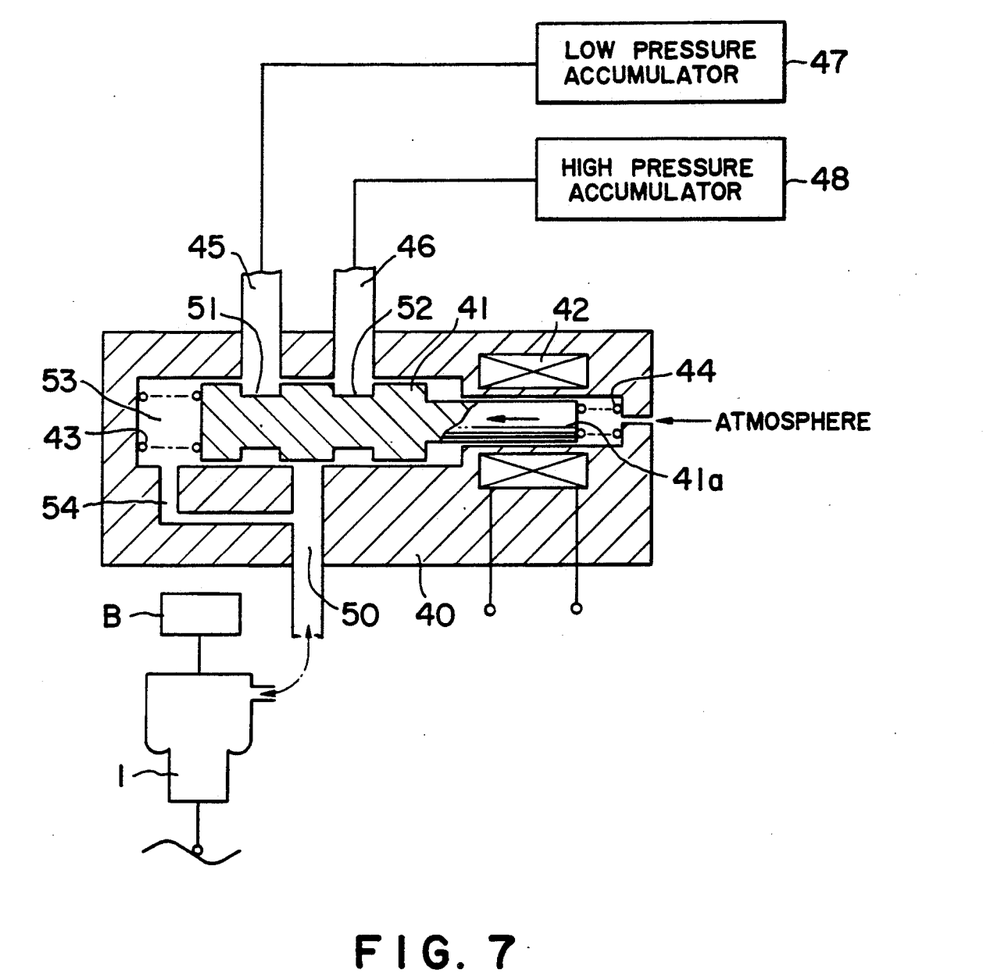
FIG. 7 is a sectional view of a pressure control valve used in the second embodiment.

In a second embodiment of the present invention shown in FIGS. 6 and 7, control of the active suspensions is carried out by adjusting the pressure in the suspensions.

For controlling the pressure in the suspensions, a known proportional pressure control valve shown in FIG. 7 is used. The control valve comprises a housing 40, a valve spool 41 and a solenoid 42. The spool 41 is resiliently urged by coil springs 43 and 44 in the axial direction thereof. The housing 40 has a first port 45 communicating with a low-pressure air accumulator 47 and a second port 46 communicating with a high-pressure air accumulator 48. The housing 40 further has a third port 50 communicating with the air chamber B of one of the suspensions 1a, 1b, 1c and 1d.

The spool 41 has first and second grooves 51 and 52 cooperable with the first and second ports 45 and 46, respectively. The spool 41 can selectively take three positions. The first position communicatively connects the low-pressure accumulator 47 with the air chamber B. The second position connects the high-pressure accumulator 48 with the air chamber B. The third position cuts off the communication of the air chamber B with both the accumulators 47 and 48.

The housing 40 has an end chamber 53 communicating with the third port 50 via a passage 54 so that the pressure of the air chamber B acts on one end surface of the spool 41. The spool 41 has an axial extension 41a passing through the solenoid 42.

Accordingly, the internal pressure of the air chamber can be adjusted by variably controlling the voltage impressed to the solenoid 42. When the impressed voltage is zero, the pressure of the air chamber B is set at a predetermined reference pressure due to a balance between the force of the spring 44 and the resultant force of the pressure in the end chamber 53 and the force of the spring 43. It will be understood that the voltage impressed to the solenoid 42 is proportional to variation of the air chamber pressure from the reference pressure.

FIG. 6 shows a block diagram similar to FIG. 3, of the second embodiment in which the active suspensions are controlled by adjusting the air pressure in the suspensions with the use of the pressure control valve shown in FIG. 7.

The fundamental function of the system of FIG. 6 is the same as that of the system of FIG. 3 except that the system of FIG. 3 calculates the flow rate of oil as the control quantity Q while the system of FIG. 6 calculates the voltage to be impressed, i.e., the variation of the air chamber pressure, as the control quantity P. It will be noted from FIG. 6 that the gain circuits $G_1$, $G_2$ and $G_3$ output control quantities $P_1$, $P_2$ and $P_3$, respectively, and the control quantity converting circuit 28 delivers signals $P_4$, $P_5$, . . .

The internal pressure of the air chamber B is equivalent to the suspension reaction force. For this reason, the mean suspension reaction force calculating circuit 30b calculates a mean suspension reaction force in response to the control quantity P as the pressure variation from the control quantity correcting circuit R, instead of the signal from the suspension reaction force sensor 29 shown in FIG. 3.

Figure 8:
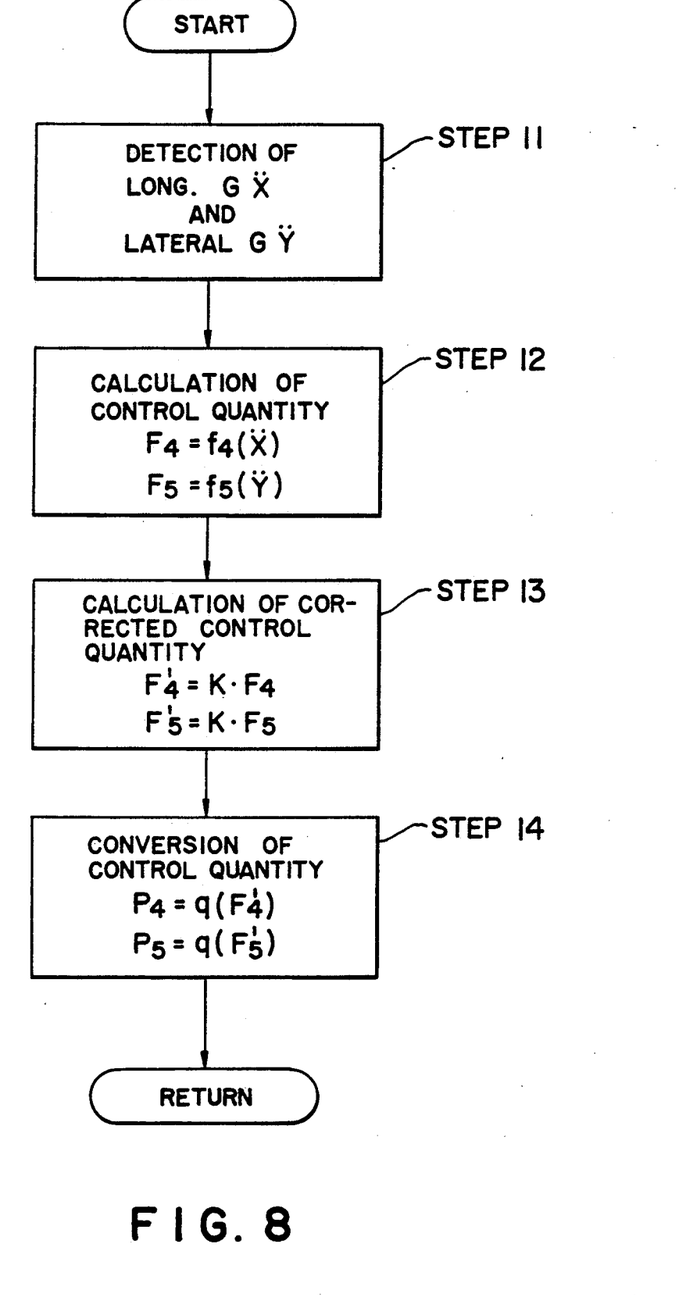
FIG. 8 is a flow chat showing control steps of system according to the second embodiment.

A flow chart for the second embodiment is shown in FIG. 8.

As described above, the system according to the second embodiment performs control to compensate for variation of the vehicle body weight without using special suspension reaction force sensors as used in the first embodiment. Therefore, the system according to the second embodiment is less expensive.

It is to be noted that the present invention is not limited to the embodiments thereof illustrated in FIGS. 2, 3, 6 and 7 but is applicable to any active suspension system of the following description. Such an active suspension system has suspensions supporting the vehicle body by fluid pressure. Means are provided for detecting at least variations in the extension-contraction strokes of the suspensions. The active suspension system also carries out charge and discharge of the fluid into and out of each suspensions independently so as to maintain the vehicle attitude in normal state in accordance with the variations in the extension-contraction strokes of the suspensions. The system further has a longitudinal G-sensor for detecting the longitudinal G of the vehicle and/or a lateral G-sensor for detecting the lateral G of the vehicle. From the detection signals of the longitudinal and lateral G-sensors, the charge and discharge of the fluid are controlled so as to maintain the vehicle attitude in desired state.

According to the present invention described above, the vehicle attitude is controlled so as to match the vehicle weight with high precision and good response during acceleration, deceleration and turning, and the utility of the function of the active suspensions is improved.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An active suspension control system for a motor vehicle having a plurality of wheels and having a fluid suspension provided between a body of said motor vehicle and each wheel for supporting said body, control means for charging and discharging a fluid into and out of said fluid suspension in order to extend and contract said suspension respectively, a plurality of sensors for sensing behavior of the motor vehicle and for producing sensor signals indicative thereof, said sensors including G-sensor means mounted on said motor vehicle for detecting acceleration of the vehicle and for generating an acceleration signal indicative thereof and a vehicle speed sensor for detecting vehicle speed and for generating a vehicle speed signal indicative thereof, and a controller for calculating a control quantity based on said acceleration signal and a standard vehicle weight and for producing a control quantity signal to the control means to adjust an amount of the fluid so as to maintain an attitude of the motor vehicle, the system comprising:

suspension reaction force detection means for detecting reaction force applied to each suspension;

determining means responsive to said sensor signals for determining a constant-speed and straight-ahead driving state of the motor vehicle and for generating a driving state signal indicating said state when said vehicle is at constant speed and straight-ahead driving state;

first calculating means for calculating a mean value, as the load on the motor vehicle, of said reaction force on each suspension during a predetermined time period when said driving state signal is generated by said determining means and for producing a mean value signal for each suspension indicative thereof;

correcting means responsive to each of said mean value signals for correcting said control quantity for each suspension so as to maintain the attitude of the motor vehicle under a transitional condition in an optimum state even when the vehicle weight changes from said standard vehicle weight;

said correcting means including second calculating means responsive to the magnitude of each of said mean value signals for calculating a corrected gain to be applied to the control quantity for correction thereof, first computing means responsive to a signal from said G-sensor means and said corrected gain for calculating a load shift quantity corresponding to the change of the load applying to the suspension due to the acceleration or deceleration of the vehicle and second computing means responsive to said load shift quantity for calculating the control quantity.

2. The system according to claim 1, wherein said first calculating means is adapted to respond to said predetermined time which is longer than a pitching period of the motor vehicle.

3. The system according to claim 2, wherein said first calculating means is adapted to respond in approximately two seconds.

4. The system according to claim 1, wherein said G-sensor means comprises a longitudinal G-sensor for sensing a longitudinal acceleration of the motor vehicle and a lateral G-sensor for sensing a lateral acceleration of the motor vehicle, and said determining means is responsive to said longitudinal and lateral G-sensors for determining the constant-speed and straight-ahead driving state when the magnitudes of said longitudinal and lateral accelerations are both zero.

5. The system according to claim 1, wherein said plurality of sensors include a steering angle sensor for sensing a steering angle of the motor vehicle, and said determining means is responsive to said vehicle speed sensor and said steering angle sensor for determining the constant-speed and straight-ahead driving state when the vehicle speed is constant and the steering angle is zero angle.

6. The system according to claim 1, wherein said controller is adapted to produce a control quantity corresponding to the flow rate of the fluid to be charged or discharged into or out of each suspension.

7. The system according to claim 6, wherein said suspension reaction force detection means is a sensor for sensing the internal pressure of the suspension as the reaction force.

8. The system according to claim 1, wherein said controller is adapted to produce a control quantity corresponding to internal pressure of the suspension.

9. The system according to claim 8, wherein said detection means is adapted for introducing the control quantity to be applied to each suspension to said calculating means as the reaction force 10. An active suspension control system for a motor vehicle having a plurality of wheels and having a fluid suspension provided between a body of said motor vehicle and each wheel for supporting said body, control means for charging and discharging a fluid into and out of said fluid suspension in order to extend and contract said suspension respectively, a plurality of sensors for sensing behavior of the motor vehicle and for producing sensor signals indicative thereof, said sensors including G-sensor means mounted on said motor vehicle for detecting acceleration of the vehicle and for generating an acceleration signal indicative thereof and a vehicle speed sensor for detecting vehicle speed and for generating a vehicle speed signal indicative thereof, and a controller for calculating a control quantity based on said acceleration signal and a standard vehicle weight and for producing a control quantity signal to the control means to adjust an amount of the fluid so as to maintain an attitude of the motor vehicle, the system comprising:

suspension reaction force detection means for detecting reaction fore applied to each suspension;

determining means responsive to said sensor signals for determining a constant-speed and straight-ahead driving state of the motor vehicle and for generating a driving sate signal indicating said state when said vehicle is at constant-speed and straight-ahead driving state;

first calculating means for calculating a mean value, as the load on the motor vehicle, of said reaction force on each suspension during a predetermined time period when said driving state signal is generated by said determining means and for producing a mean value signal for each suspension indicative thereof;

correcting means responsive to each of said mean value signals for correcting said control quantity for each suspension so as to maintain the attitude of the motor vehicle under a transitional condition in an optimum state even when the vehicle weight changes form said standard vehicle weight; and said correcting mean including second calculating means responsive to the magnitude of each of said mean value signals for calculating a rate between said mean value and a reference reaction force defined at the standard vehicle weight, said rate to be applied to the control quantity for correcting thereof.

11. The system according to claim 10, wherein said controller is adapted to preset to said standard vehicle weight the weight of the motor vehicle with one passenger in the vent that the motor vehicle is driven straight ahead at a constant speed.

12. An active suspension control system for a motor vehicle having a plurality of wheels and having a fluid suspension provided between a body of said motor vehicle and each wheel for supporting said body, control means for charging and discharging a fluid into and out of said fluid suspension in order to extent and contract said suspension respectively, a plurality of sensors for sensing behavior of the motor vehicle and for producing sensor signals indicative thereof, said sensors including G-sensor means mounted on said motor vehicle for detecting acceleration of the vehicle and for generating an acceleration signal indicative thereof and a vehicle speed sensor for detecting vehicle speed and for generating a vehicle speed signal indicative thereof, and a controller for calculating a control quantity based on said acceleration signal and a standard vehicle weight and for producing a control quantity signal to the control means to adjust an amount of the fluid so as to maintain an attitude of the motor vehicle, the system comprising:

suspension reaction force detection means for detecting reaction force applied to each suspension;

determining means responsive to said sensor signals for determining a constant-speed and straight-ahead driving state of the motor vehicle and for generating a driving state signal indicating said state when said vehicle is at constant-speed and straight-ahead driving state;

first calculating means for calculating a mean value, as the load on the motor vehicle, of said reaction force on each suspension during a predetermined time period when said driving state signal is generated by said determining means and for producing a mean value signal for each suspension indicative thereof;

correcting means responsive to each of said mean value signals for correcting said control quantity for each suspension so as to maintaining the attitude of the motor vehicle under a transitional condition in an optimum state even when the vehicle weight changes form said standard vehicle wight;

said G-sensor means comprising a longitudinal G-sensor for sensing a longitudinal acceleration of the motor vehicle and a lateral G-sensor for sensing a lateral acceleration of the motor vehicle;

said determining means being responsive to said longitudinal and lateral G-sensors for determining the constant-speed an straight-ahead driving sate when the magnitude of said longitudinal and lateral accelerations are both zero; and said correcting means including a corrected gain calculating device responsive to each of said mean value signal for calculating a corrected gain, a longitudinal load shift calculation device responsive to said longitudinal acceleration and said corrected gain for calculating a load shift quantity of said body in the longitudinal direction due to the acceleration or deceleration of the vehicle and for producing a longitudinal load shift quantity signal, a first suspension reaction force variation calculating device responsive to said longitudinal load shift quantity signal for calculating a reaction force variation in the suspension and for producing a first variation signal, a rolling moment calculating device responsive to said lateral acceleration for calculating a rolling moment exerted on said body and for producing a rolling moment signal, a lateral load shift quantity calculating device responsive to said rolling moment signal and said corrected gain for calculating a load shift quantity of said body in the lateral direction due to the rolling of the vehicle and for producing a lateral load shift quantity signal, a second suspension reaction force variation calculating device responsive to said lateral load shift quantity signal for calculating a reaction force variation in the suspension and for producing a second variation signal and a control quantity calculating device responsive to said first and second variation signals for calculating said control quantity to be supplied to said control means.

* * * * *